US007073993B2

(12) United States Patent
Cooper et al.

(10) Patent No.: US 7,073,993 B2
(45) Date of Patent: Jul. 11, 2006

(54) SWITCH ASSEMBLY

(75) Inventors: Randy G. Cooper, Jackson, TN (US); Mark A. Etter, Jackson, TN (US); Greg K. Griffin, Humboldt, TN (US); Ginger L. Allen, Jackson, TN (US); Derrick Kilbourne, Jackson, TN (US)

(73) Assignee: Porter-Cable Corporation, Jackson, TN (US)

( * ) Notice: Subject to any disclaimer, the term of this patent is extended or adjusted under 35 U.S.C. 154(b) by 0 days.

(21) Appl. No.: 10/458,167

(22) Filed: Jun. 10, 2003

(65) Prior Publication Data

US 2006/0078395 A1 Apr. 13, 2006

Related U.S. Application Data

(60) Provisional application No. 60/418,510, filed on Oct. 15, 2002, provisional application No. 60/467,169, filed on May 1, 2003.

(51) Int. Cl.
*B23C 1/20* (2006.01)

(52) U.S. Cl. ...................... 409/182; 409/175; 409/181; 144/136.95

(58) Field of Classification Search ................ 409/182, 409/175, 181, 134, 171, 209, 241, 210, 214, 409/218; 144/136.95, 154.5
See application file for complete search history.

(56) References Cited

U.S. PATENT DOCUMENTS

| | | | |
|---|---|---|---|
| 1,370,895 A | 3/1921 | Loomis | |
| 1,514,894 A | 11/1924 | Carter | |
| 1,565,790 A | 12/1925 | Carter | |
| 1,584,078 A | 5/1926 | Carter | |
| 1,820,162 A | 8/1931 | Salvat | |
| 2,353,202 A | 7/1944 | Tautz | 144/134 |
| 3,791,260 A | 2/1974 | Ambler et al. | 90/12 D |
| 4,294,297 A | 10/1981 | Kieffer | 144/134 D |
| 4,410,022 A | 10/1983 | Peterson | 144/1 F |
| 4,445,811 A | 5/1984 | Sanders | 409/182 |

(Continued)

FOREIGN PATENT DOCUMENTS

CA 2314653 7/2000

OTHER PUBLICATIONS http://www.dremel.com/productdisplay/tool_template2.asp?SKU=9000-04&Color=99CCFF, #9000-04 Advantage Rotary Saw Kit, Mar. 21, 2003, 1 page.

(Continued)

*Primary Examiner*—Derris H. Banks
*Assistant Examiner*—Dana Ross
(74) *Attorney, Agent, or Firm*—Suiter West Swantz pc llo

(57) ABSTRACT

The present invention is directed to an apparatus for providing convenient control of a power tool electrical system. A switch assembly of the present invention includes a first actuator and a second actuator, which is disposed remotely from the switch and first actuator. The second actuator is connected via a coupling device, such that user manipulation of either the first or second actuator is capable of controlling electricity flowing to the motor. Including a second actuator may permit the user to retain greater control over the tool when turning the power on or off. In additional exemplary aspects, a coupling device included in the switch assembly is configured and arranged so as to prevent inadvertent damage to the power tool such as by accidental engagement of a shaft lock while the motor is operating.

12 Claims, 12 Drawing Sheets

U.S. PATENT DOCUMENTS

| | | | | |
|---|---|---|---|---|
| 4,537,234 | A | 8/1985 | Onsrud | 144/134 A |
| 4,562,872 | A | 1/1986 | Fushiya et al. | |
| D286,132 | S | 10/1986 | Yamamoto | |
| 4,679,606 | A | 7/1987 | Bassett | 144/134 A |
| 4,770,573 | A | 9/1988 | Monobe | 409/182 |
| D300,501 | S | 4/1989 | Zurwelle | |
| RE33,045 | E | 9/1989 | Gronholz et al. | |
| 4,938,642 | A | 7/1990 | Imahashi et al. | 409/182 |
| 5,056,375 | A | 10/1991 | Kapton et al. | 74/89.15 |
| 5,078,557 | A | 1/1992 | McCracken | |
| 5,088,865 | A | 2/1992 | Beth et al. | |
| 5,094,575 | A | 3/1992 | Kieser et al. | |
| 5,139,061 | A | 8/1992 | Neilson | 144/134 A |
| D340,174 | S | 10/1993 | Hoshino et al. | |
| 5,273,089 | A | 12/1993 | Fuchs et al. | 144/134 D |
| D349,637 | S | 8/1994 | Hoshino et al. | |
| 5,590,989 | A | 1/1997 | Mulvihill | 409/182 |
| 5,699,844 | A | 12/1997 | Witt | 144/329 |
| 5,725,036 | A | 3/1998 | Walter | 144/135.2 |
| 5,803,684 | A | 9/1998 | Wang | 409/229 |
| 5,853,274 | A | 12/1998 | Coffey et al. | 409/182 |
| 5,918,652 | A | 7/1999 | Tucker | 144/371 |
| 5,921,730 | A * | 7/1999 | Young et al. | 409/182 |
| D416,460 | S | 11/1999 | Bosten et al. | |
| 5,988,241 | A * | 11/1999 | Bosten et al. | 144/154.5 |
| 6,050,759 | A * | 4/2000 | Bone | 409/182 |
| 6,289,952 | B1 | 9/2001 | Jones et al. | 144/135.2 |
| 6,305,447 | B1 | 10/2001 | Rousseau | 144/135.2 |
| 6,318,936 | B1 | 11/2001 | McFarlin, Jr. et al. | 409/131 |
| 6,443,675 | B1 * | 9/2002 | Kopras et al. | 409/182 |
| 6,474,378 | B1 * | 11/2002 | Ryan et al. | 144/154.5 |
| 6,505,659 | B1 | 1/2003 | Hummel | 144/135.2 |
| 6,520,224 | B1 | 2/2003 | Smith | 144/135.2 |
| 6,520,227 | B1 | 2/2003 | McFarlin, Jr. et al. | 144/371 |
| 6,550,154 | B1 | 4/2003 | Smith | 33/638 |
| 6,725,892 | B1 | 4/2004 | McDonald et al. | |
| 6,739,066 | B1 | 5/2004 | Smith | 33/638 |
| 6,792,984 | B1 | 9/2004 | Fontaine | 144/135.2 |
| 2002/0020466 | A1 | 2/2002 | McFarlin, Jr. et al. | 144/135.2 |
| 2002/0079021 | A1 | 6/2002 | Smith | 144/135.2 |
| 2003/0188441 | A1 * | 10/2003 | Patton | 30/381 |
| 2003/0205292 | A1 | 11/2003 | Smith | 144/252.1 |
| 2003/0223835 | A1 | 12/2003 | Hummel | 409/182 |
| 2004/0035495 | A1 | 2/2004 | Hessenberger et al. | 144/136.95 |
| 2004/0194854 | A1 | 10/2004 | McDonald et al. | 144/136.95 |
| 2004/0200543 | A1 | 10/2004 | McDonald et al. | 144/136.95 |
| 2004/0250891 | A1 | 12/2004 | McDonald et al. | 144/136.95 |
| 2004/0253068 | A1 | 12/2004 | Gerhardt et al. | 409/182 |

OTHER PUBLICATIONS

Bosch 1617 Shop Router, Parts Diagram, Jul. 1998.

Bosch Router Models, Owners Manual, p. 1-22, http//www.boschtools.com.

Triton TRC-001 Review, 3.25 Plunge Router, http://www.mv.com/users/besposito/woodworking/triton/, Feb. 27, 2004.

* cited by examiner

SWITCH ASSEMBLY

CROSS REFERENCE

The present application claims priority under 35 U.S.C. §119(e) to U.S. Provisional Patent Ser. Nos. 60/418,510, entitled: Router, filed on Oct. 15, 2002, and U.S. Provisional Patent Ser. No. 60/467,169, entitled: Router, filed on May 1, 2003 both of which are hereby incorporated by reference in their entirety.

FIELD OF THE INVENTION

The present invention generally relates to the field of power tools and more particularly to a multi-position switch assembly for a router.

BACKGROUND OF THE INVENTION

Power tools are routinely employed to reduce time and effort required for a task, while increasing the quality of craftsmanship for the user. Convenient usage may be a determining factor in a user's decision to purchase a particular tool. In order to satisfy user demands, tools should allow the user a wide range of functionality, be ergonomically configured, and promote user control.

Woodworkers are among some of the most demanding power tool users. To an experienced woodworker the quality of the finished product is a reflection of the tools and techniques employed to finish the task. Previously, routers, and in particular removable base routers, included a single switch mounted on the motor housing for controlling the router's electrical system. This configuration permits the user to employ different bases such as a fixed base, a plunge base, and the like. A drawback to this switch arrangement is that a user may have to use one hand to hold a knob type router handle while using their free hand to turn on or off the switch. Further, routers such as these typically utilize a switch mounted opposite the base which may be difficult to reach when rasping either the motor housing and/or the main portion of the base. Again, the user may be forced to hold the motor housing with one hand while turning the electrical system on or off.

Since routers may accept a wide variety of bits, users often change bits repeatedly. Furthermore, bit changes may be time consuming as a user is forced to position the newly selected bit to the desired depth. For example, a user may use a strait cutting bit to form a rabbit for a shelf and then, wish to switch to a dovetail bit to dovetail a drawer. Therefore, a wide variety of methods are employed to facilitate bit changes. For instance, two wrenches may be utilized to remove a collet and bit assembly. In other instances, drive shaft locks may be utilized to prevent rotation of the shaft when changing bits. Changeing router bit utilizing a shaft lock may be difficult as the shaft lock is positioned adjacent the collet, thereby requiring a user to depress a drive shaft lock while manipulating the collet with a wrench.

Therefore, it would be desirable to provide a switch assembly for conveniently activating and deactivating a power tool electrical system, and particularly, a switch assembly for routers.

SUMMARY OF THE INVENTION

Accordingly, the present invention is directed generally to a switch assembly for use in power tools, such as routers, and the like.

In a first aspect of the present invention, a power tool includes a switch assembly with a switch electrically coupled to the power tool's motor. A coupling device is mounted in the motor housing such that a first actuator mounted proximal to the switch and a second actuator mounted remote from the switch may be utilized to manipulate the switch.

In a further aspect of the present invention, a switch assembly includes a coupling device configured so as to prevent a drive shaft lock from engaging the drive shaft. Thus, manipulation of an actuator connected to a coupling device may result in switching the flow of electricity on or off as well as preventing the shaft lock from being accidentally engaged with the drive shaft when the electrical system is on.

In another aspect of the invention, a switch assembly includes a coupling device which slides to obtain a locked position, wherein a biased pin shaft lock is prevented from contacting the drive shaft, such as when electrical system is on and an engaged position so as to drive the biased pin into engagement with the drive shaft such as to prevent the shaft from rotating when changing bits.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. Those of skill in the art will appreciate that the apparatus of the present invention may be implemented in various power tools such as an integrated plunge router without departing from the spirit and scope of the present invention. It is to be appreciated that generally corresponding structures have been provided with corresponding reference numbers.

Figure 1:
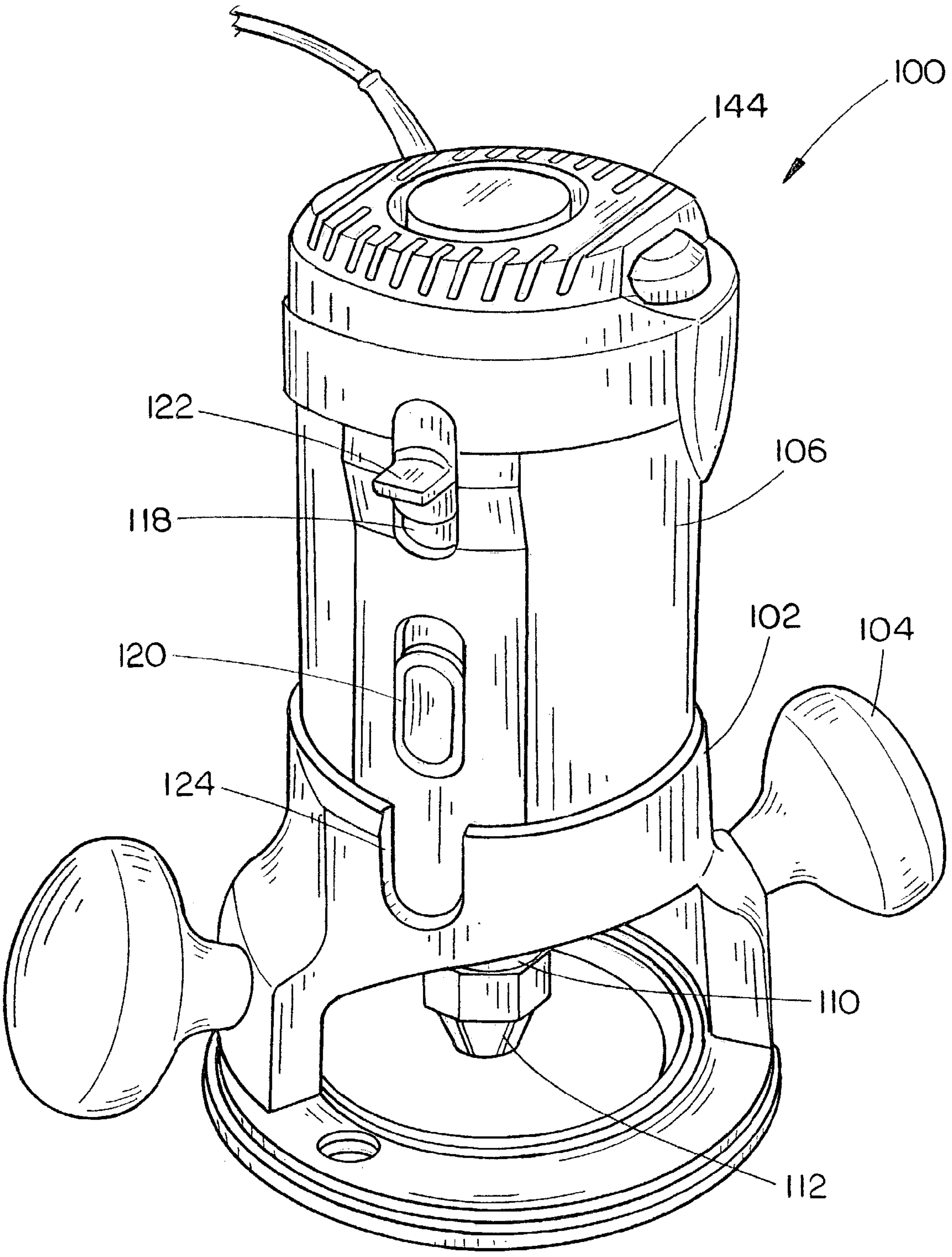
FIG. 1 is an isometric view illustrating a router in accordance with an exemplary embodiment of the present invention.

Referring to FIG. 1, a router 100 in accordance with an exemplary embodiment of the present invention is described. In the present example, the router 100 is a removable standard base type router where the motor housing 106 is removable from a base 102 for supporting the router 100 at least partially on a workpiece. When utilizing a standard base the working tool is set to a predetermined depth and fixed into position. In further embodiments, the motor housing 106 may be integrated with a plunge base in which the motor housing 106 and working tool may be directed into the field of a workpiece.

Figure 7:
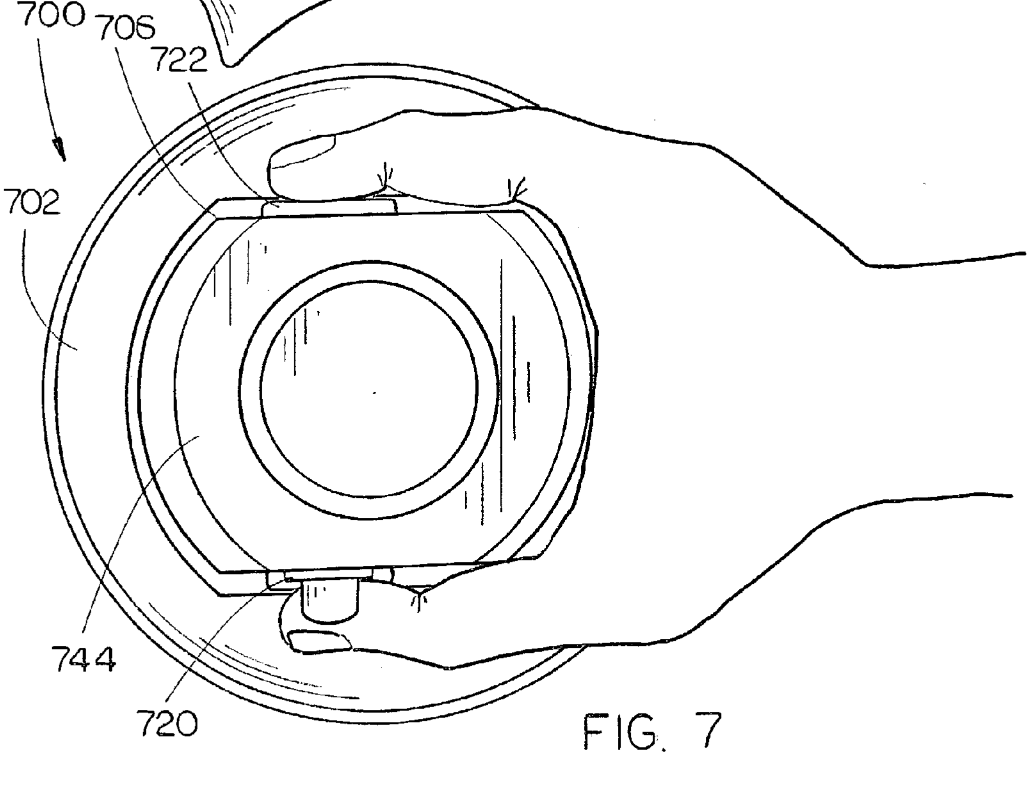
FIG. 7 is a top view of FIG. 6.

The motor housing 106 encloses a motor for rotating a drive shaft 110 including a securing mechanism such as a collet 112 for holding the working tool or bit. In a preferred embodiment, the motor housing 106 is generally cylindrical. As may be best observed in FIG. 7, in further examples, the motor housing 702 includes flattened side portions to increase user comfort and the like. Referring again to FIG. 1, the housing 106 may include a first sub-housing, preferably composed of a metal, for being received in a sleeve included in the base and a second sub-housing which may be formed of a polymer, a composite, a re-enforced polymer or composite material and the like for enclosing the motor, formed to allow ventilation, mounting electrical system components, minimizing weight, vibration and the like. Preferably, the end of the motor housing 144 generally opposite the drive shaft is generally flat to support the router/motor housing when changing bits, sub-bases or the like.

Figure 2:
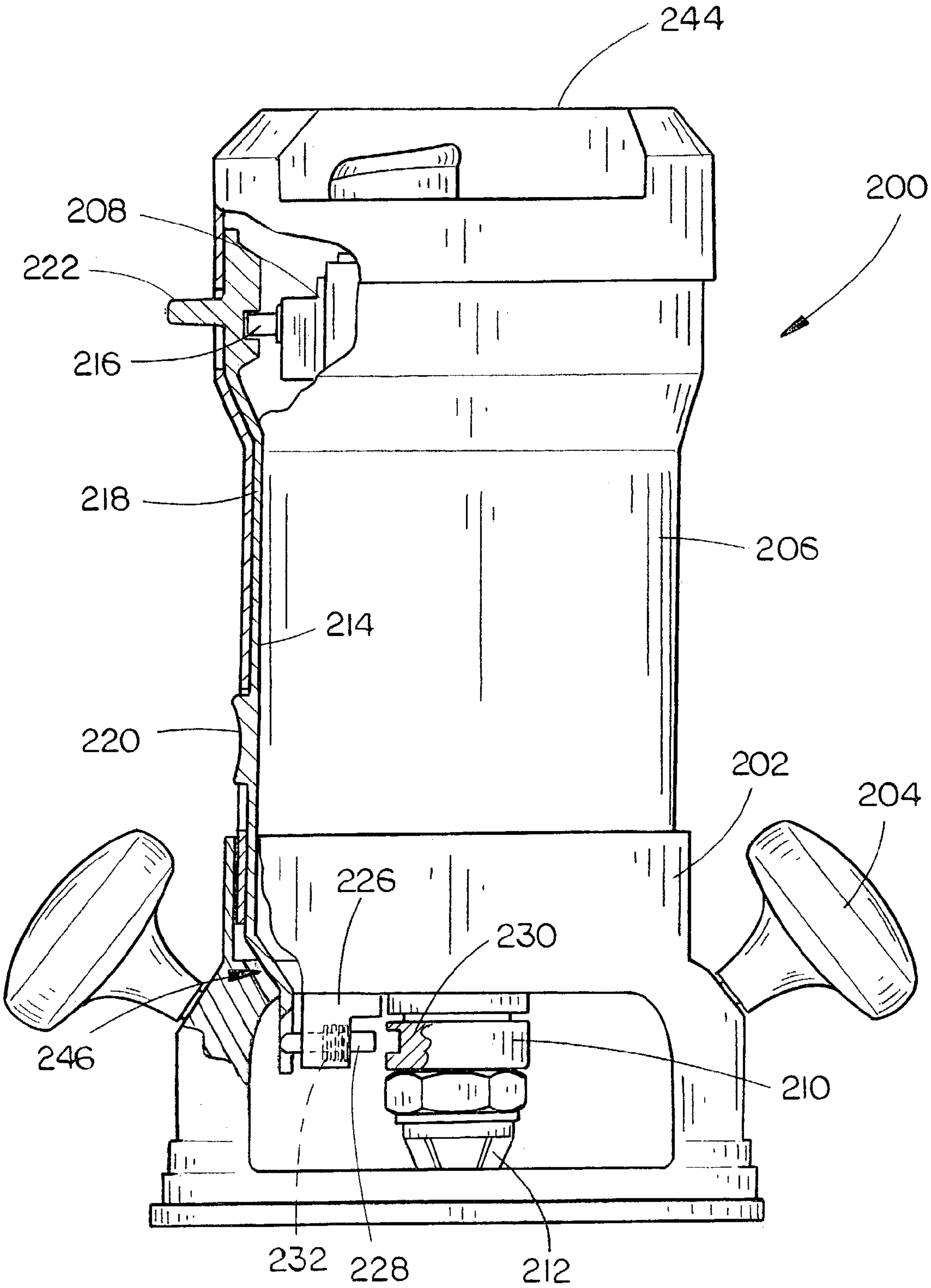
FIG. 2 is a partial cross-sectional view of a router including a biased pin shaft lock disengaged from a drive shaft.
Figure 3:
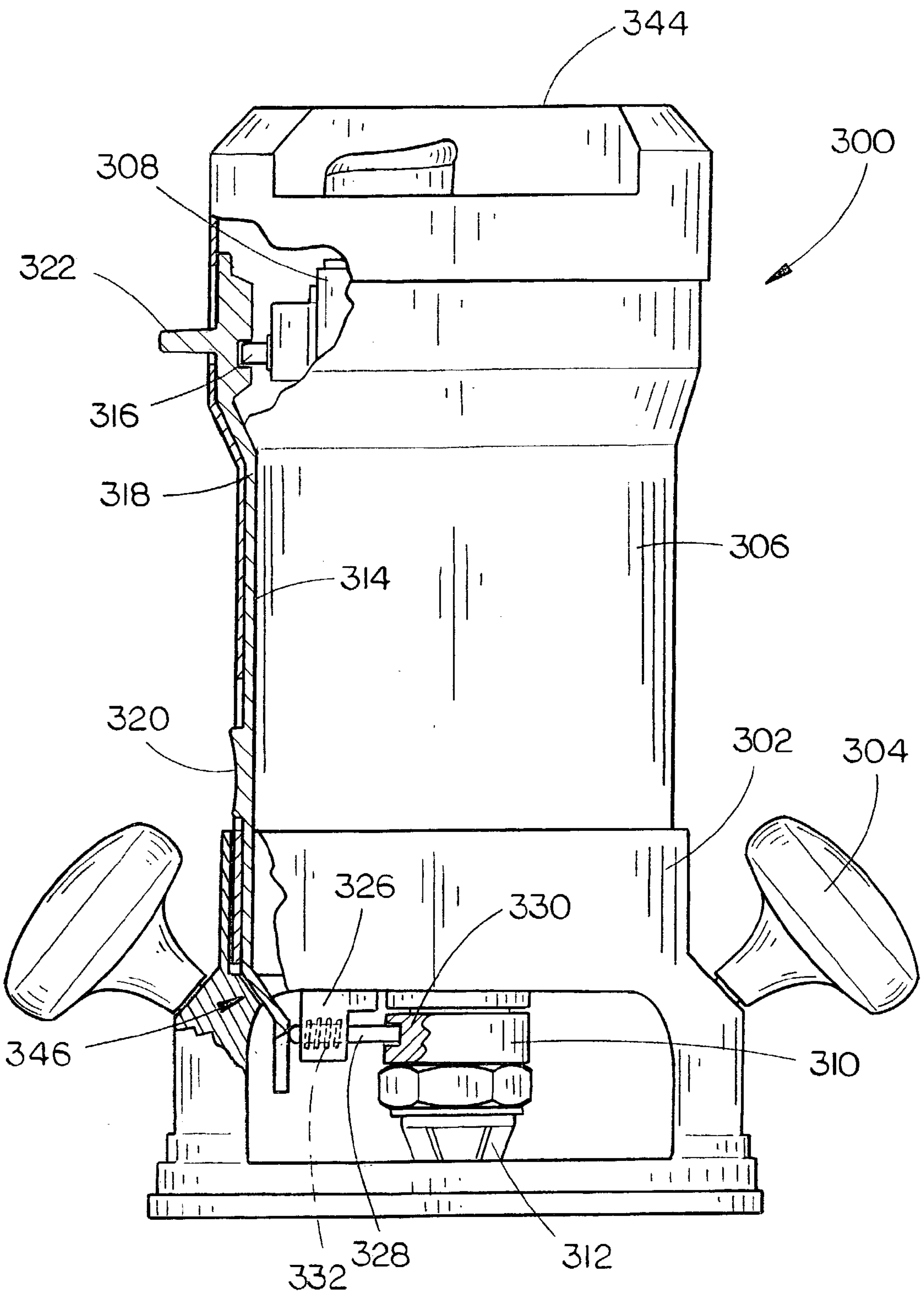
FIG. 3 is a partial cross-sectional side view of a router including a biased pin shaft lock engaged with a drive shaft.

Referring to FIG. 2, a switch assembly is disposed in the motor housing 206. In the current embodiment, a switch assembly includes a switch 208 electrically coupled to the motor for controlling the flow of electricity to the motor, a coupling device 218, a first actuator 222, disposed adjacent the switch, and a second actuator 220 disposed remotely from the switch. In an advantageous example, the switch 208 is mounted adjacent the end 244 of the motor housing opposite the drive shaft. Utilizing the switch assembly of the present invention permits users ready access to the first actuator 222 such as when utilized with a router table while providing convenient electrical system control when the router is manipulated by the user. At least one of the coupling device 218 and the first actuator 222 is connected to the switch 208 for manipulating the switch. For instance, the first actuator is connected to the coupling device which in-turn is connected to the switch, the first actuator and coupling device are both directly connected to the switch, the coupling device is connected to the switch via the first actuator and the like.

The coupling device may be formed either generally as a rod, a bar, or the like. For instance, a coupling device includes first and second actuators formed therewith and is slideably mounted in the motor housing to adjust the switch on and off. For example, the coupling device extends generally longitudinally along the generally cylindrical motor housing to dispose the second actuator remotely from the switch 208. In further embodiments, the coupling device is retained laterally in a trough recessed into the interior of the motor housing, via tabs or protrusions in the motor housing, secured in a plastic, or polymeric, segment of the motor housing and the like. Preferably, the switch is a slide switch which engages an aperture or recess 216 in the coupling device 218. In additional embodiments, various other types of switches (modes of actuation) are employed without departing from the spirit and scope of the present invention. Utilizing a slide type switch may simplify construction, reduce complexity, allow the coupling device to engage with a drive shaft lock (discussed below) and the like. The first actuator 222, the second actuator 220 and the coupling device are configured to manipulate the switch 208 to control the flow of electricity to the motor. In the present embodiment, a second actuator 220, a thumb pad type actuator, is connected to the coupling device remotely from the switch. Thus, a user may select between the first and second actuators to turn the motor on or off. Other suitable actuators, for either the first or second actuators, include flip actuators, toggle actuators, slide actuators, push button actuators, protrusions (such as extending from the coupling device), thumb pads, and the like for allowing a user to manipulate the coupling device 218/switch 208.

Figure 4:
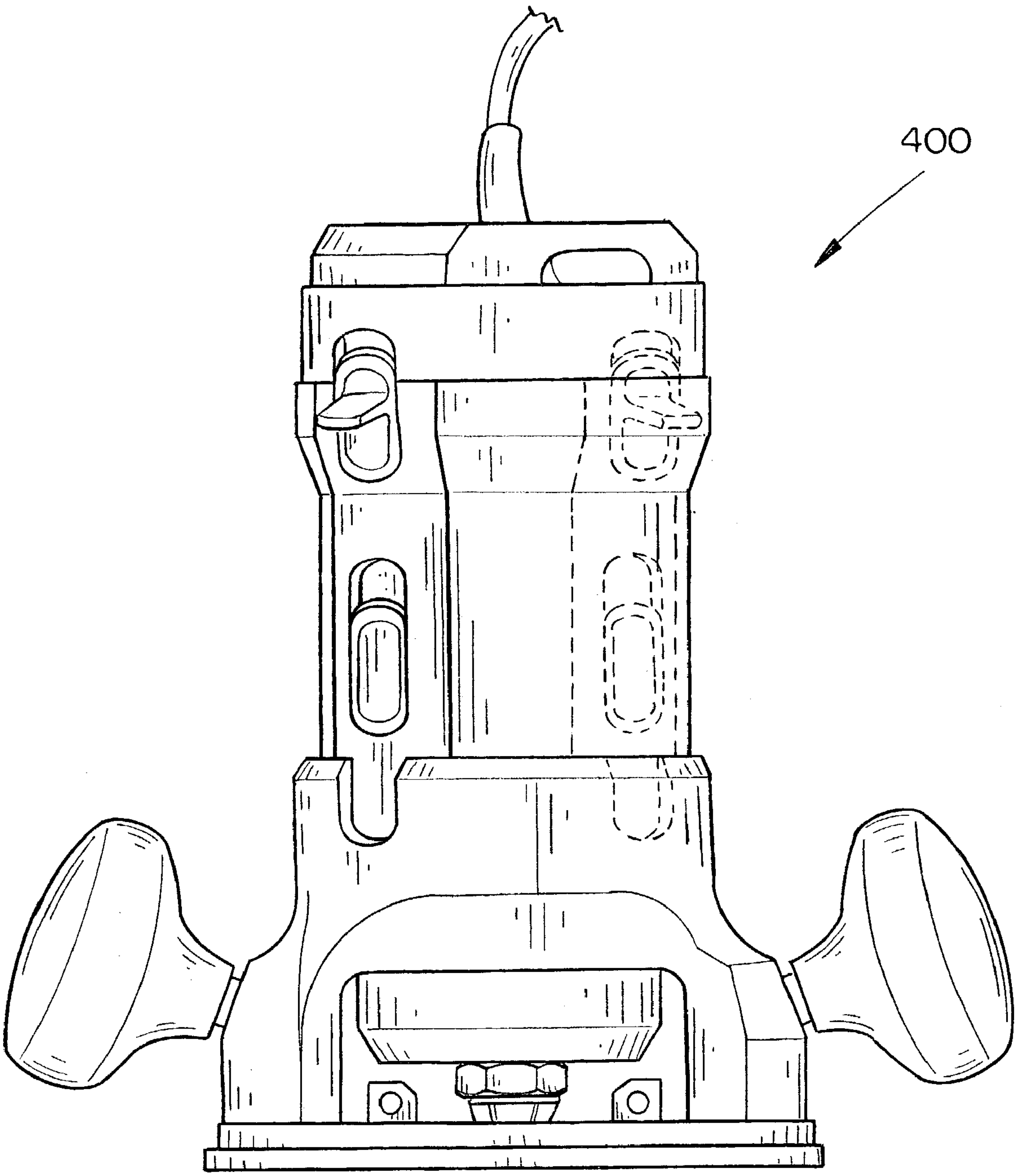
FIG. 4 is a side elevation view of the router indicating alternate positioning for dominate hand grasping.
Figure 6:
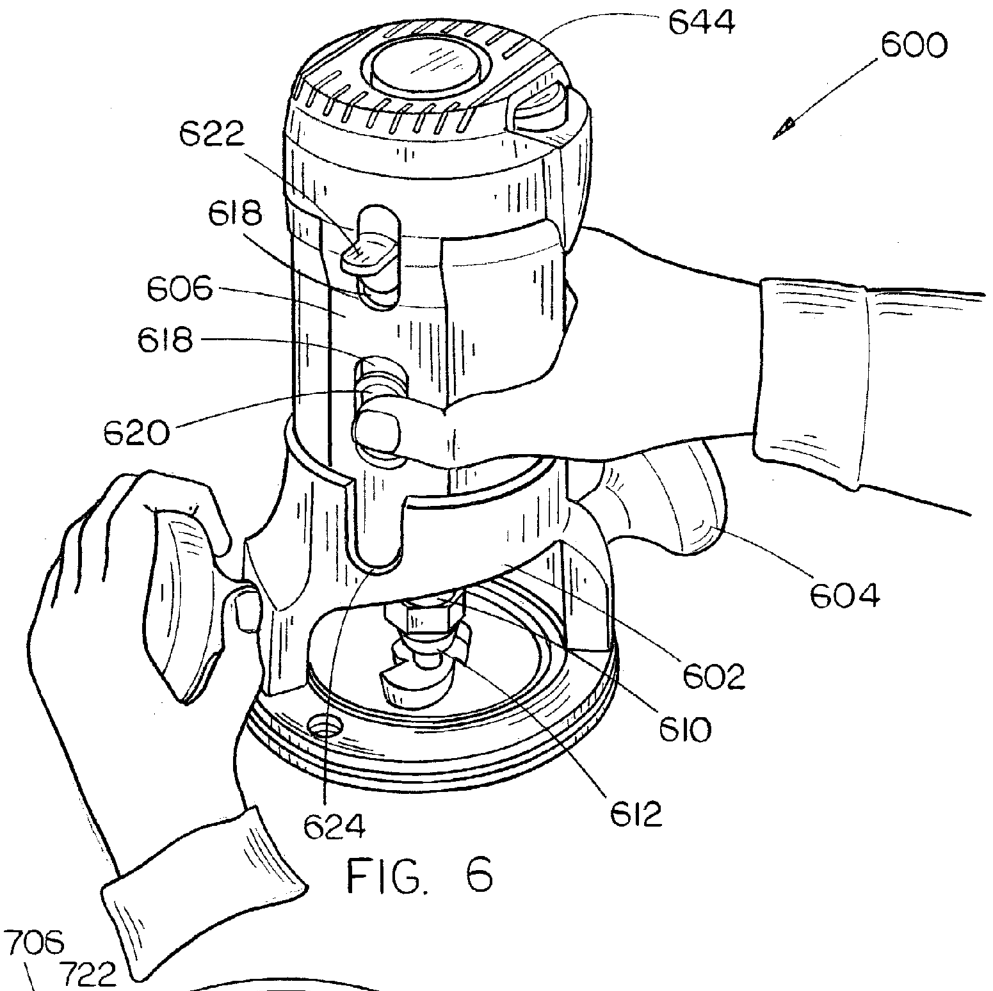
FIG. 6 is an isometric illustration of a user manipulating a router which includes a multi-position switch assembly of the present invention.

In the present embodiment, the second actuator 220 is disposed proximal to the drive shaft 210 end of the motor housing 206. Mounting the second actuator adjacent to the drive shaft may increase user control (over the tool itself) while manipulating the electrical system. Referring again to FIG. 1, the base/base sleeve may include a contoured portion 124 to accept the second actuator while providing the user access, therefore further allowing the second actuator 120 to be disposed adjacent the drive shaft end of the motor housing while permitting greater depth adjustment. Referring now to FIG. 6, the present switch assembly, wherein the second actuator is disposed adjacent the base 602 is particularly advantageous in that a user grasping the base/motor housing may conveniently control the flow of electricity to the motor without having to reposition their hand, release their grip, or grasp adjacent the flat end of the motor housing 644, therefore allowing for more control, while directing the tool, and increasing user satisfaction. In situations where the user grasps a handle 604, the user may easily reach the second actuator 620 with their thumb to control the electrical system. This arrangement allows the user to retain a higher level of control over the router 200 when turning the electrical system on or off. Further, the switch assembly may be disposed to correspond to a user's dominate hand. See generally, FIG. 4.

In a further embodiment, the coupling device 218, the first actuator 222, and the second actuator 220 are formed unitary, such as a plastic, or polymeric, bar designed to contour around internal components in the motor housing. Forming the coupling device and actuators as a single piece allows efficient manufacture, flexibility, minimizes potential repair, and the like.

Figure 5:
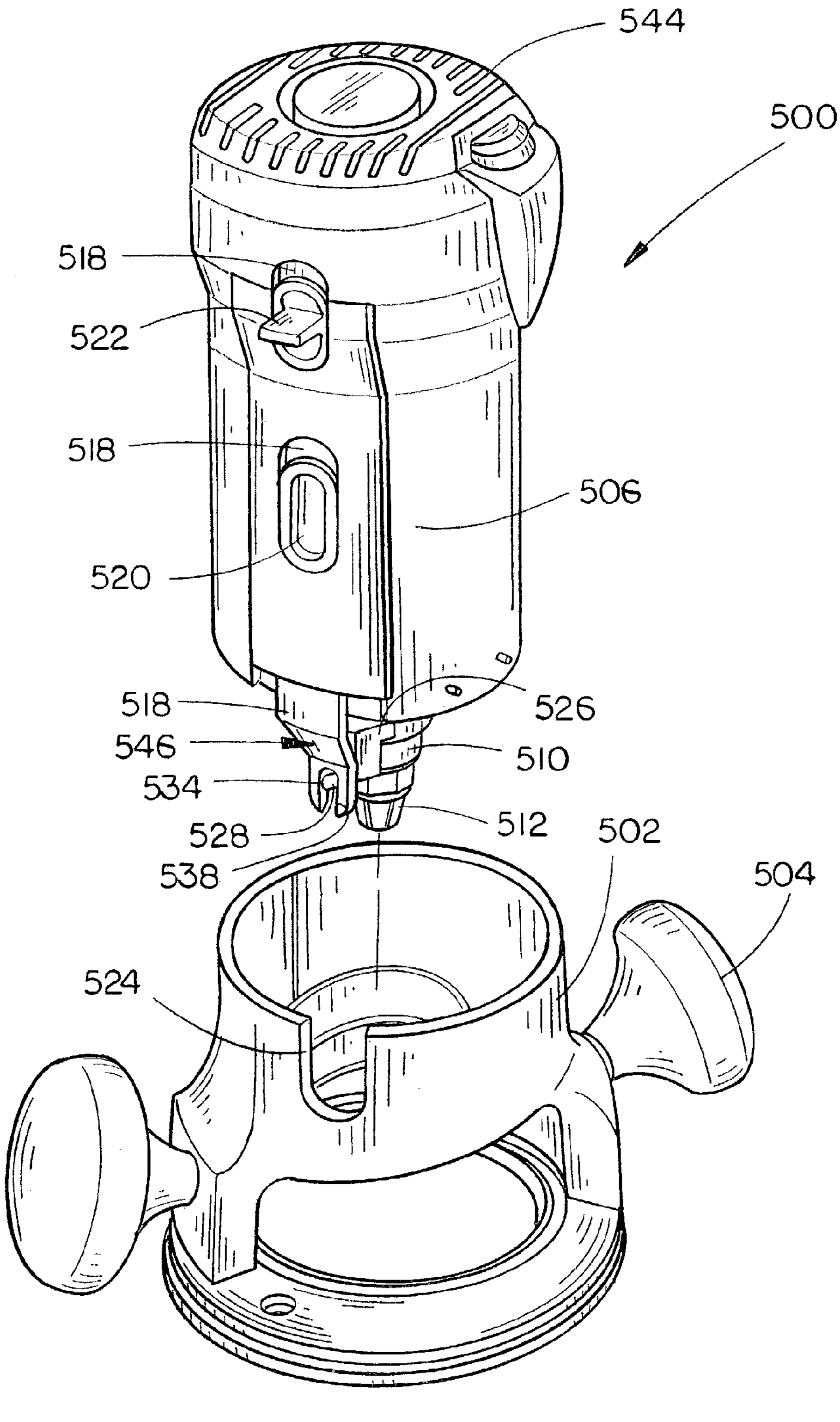
FIG. 5 is an exploded view of a router, including a coupling device with a Y-shaped terminal end.
Figure 8:
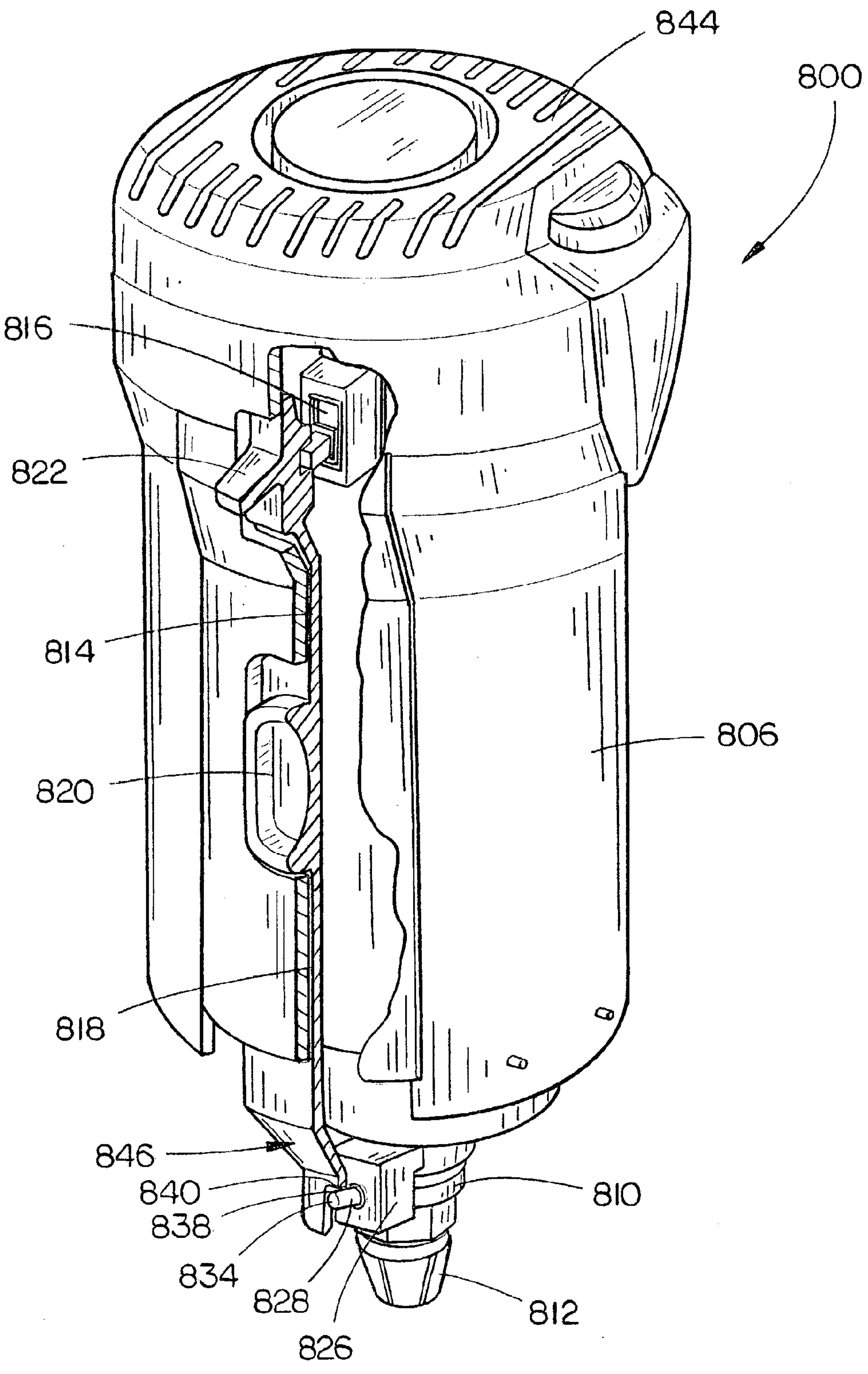
FIG. 8 is a partial cross-sectional view of a motor housing, in accordance with an exemplary embodiment of the present invention.

Referring to FIGS. 2, 3, 5, and 8, in a further aspect of the invention, a drive shaft lock is included in a router. FIGS. 5 and 8 illustrating an exploded view of a router, and a motor housing included in a router, respectively, wherein corresponding reference numbers refer to generally corresponding structures in the relevant figures. For example, the drive shaft lock is a biased pin 228 mounted in the motor housing, generally perpendicular to the drive shaft 210, for selectively engaging/disengaging the drive shaft 210. Wherein FIG. 2 illustrates a disengaged position and FIG. 3 indicates an engaged position. Inclusion of a drive shaft lock permits the user to prevent the drive shaft 210 from rotating such as when changing router bits. The biased pin 228 may engage a flattened portion of the drive shaft, a recess in the shaft and the like. Preferably, the pin 228 is biased by a spring 232 into a disengaged position. Those of skill in the art will appreciate that the coupling device itself may engage a drive shaft. For example, the coupling device may include an extension for engaging a flattened portion of a drive shaft. For instance, an extension on the coupling device may be manipulated to extend along the drive shaft between a narrowed portion of the shaft (disengaged) into an engagement with a flattened portion of the shaft adjacent the narrowed shaft segment.

In another embodiment of the present invention, a coupling device 218 includes at least one of an angled surface 246 and a convex surface such that the coupling device is capable of directing the pin 228 into engagement with the drive shaft. For example, as may be best seen in FIG. 3, upon sufficient longitudinal movement of the coupling device 318, the coupling device drives the pin, overcoming the spring 332, into engagement with the drive shaft recess 330. Engagement between the coupling device and a drive shaft lock may result from a segment of the coupling device 346 being forced towards the shaft lock through longitudinal movement of the coupling device 318 or the like. Preferably, engagement between a shaft lock and the drive shaft (an engaging position) corresponds with electricity being inhibited from flowing to the motor, or the switch 308 disposed in an "off" position. Those of skill in the art will appreciate that an apparatus of the present invention may include an intermediate "off" position in which electricity is inhibited from reaching the motor, but in which the shaft lock is not engaged with the drive shaft. Moreover, it will be appreciated that the assembly may include either a single actuator or multiple actuators as discussed previously.

Figure 9A:
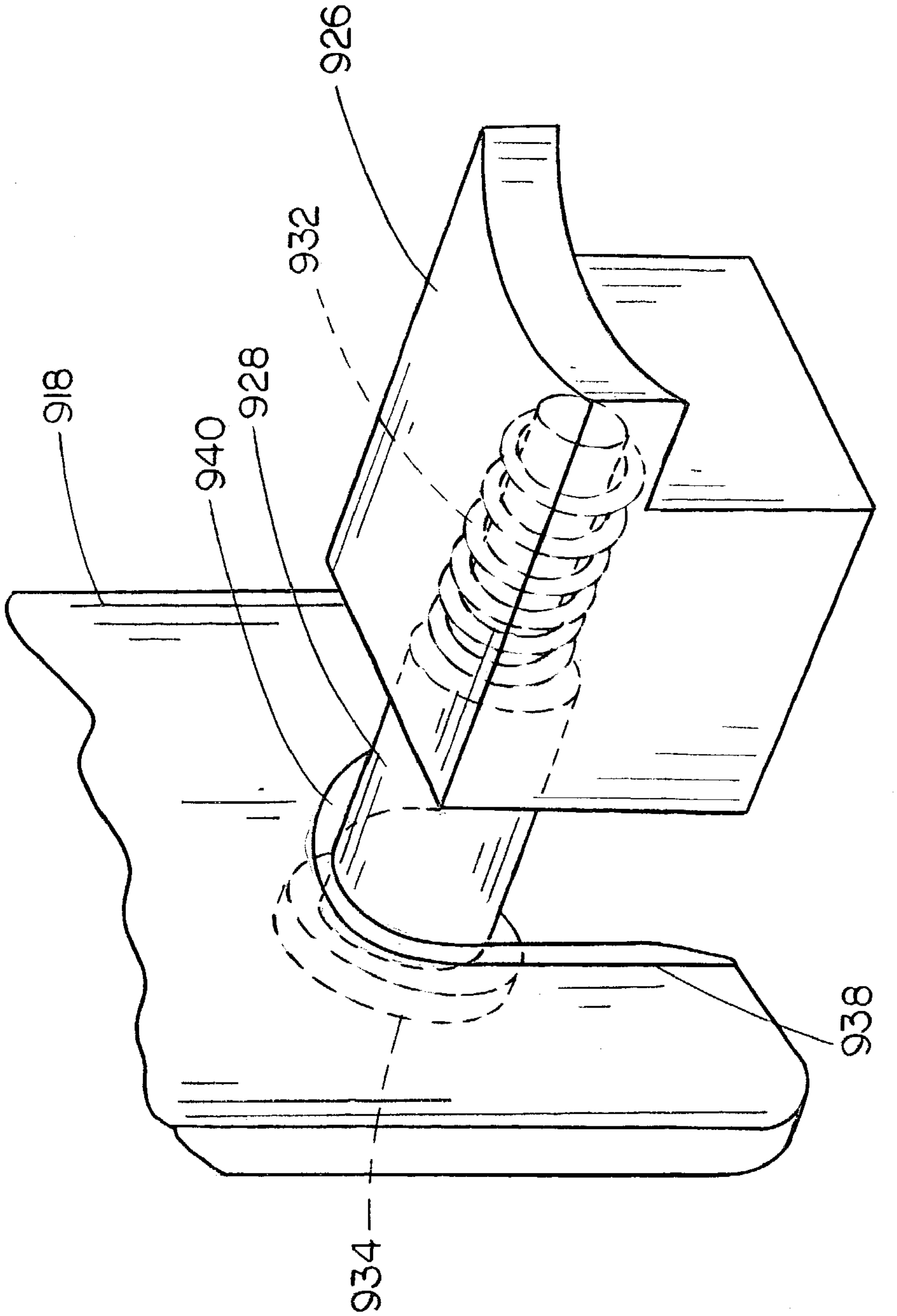
FIG. 9A is a cross-sectional view of a coupling device including a Y-shaped terminal portion for engaging with a shaft lock.
Figure 9B:
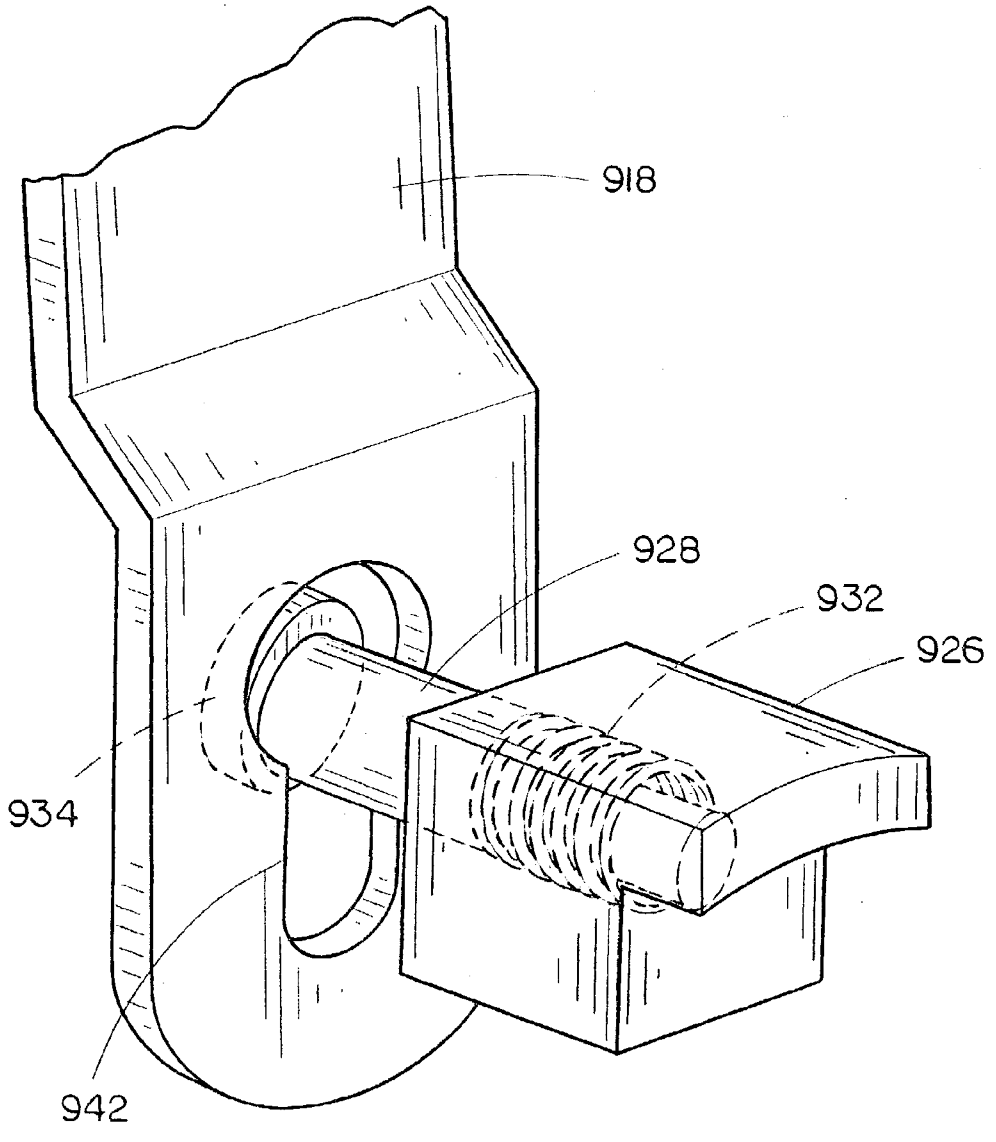
FIG. 9B is a cross-sectional view of a coupling device including a key-hole aperture therein for engaging with a shaft lock.
Figure 9C:
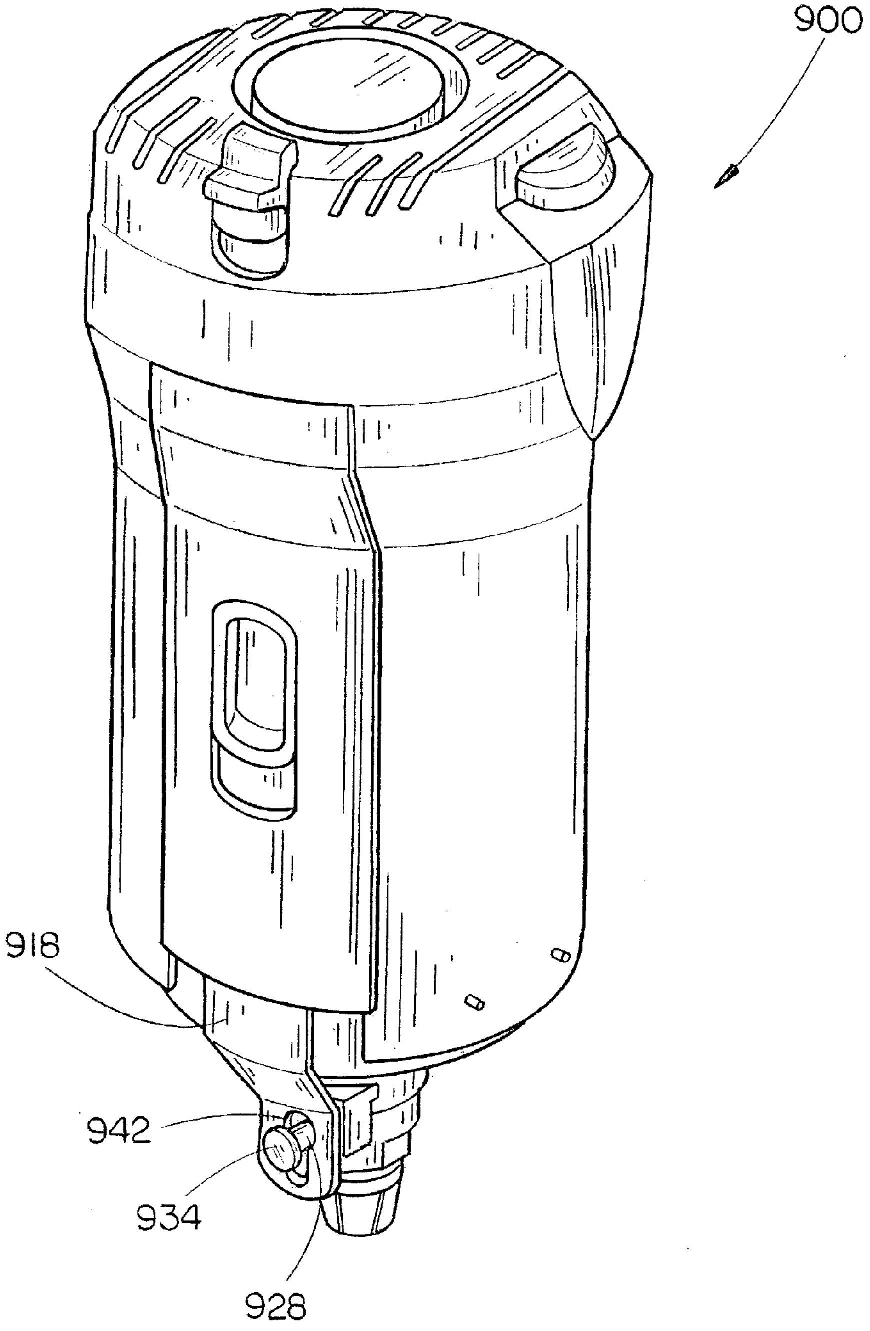
FIG. 9C is isometric view of a router including a coupling device including a key-hole aperture therein for engaging with a shaft lock.

Referring now to FIGS. 9A, 9B, and 9C, in further embodiments, a coupling device 918 includes at least one of a Y-shaped terminal portion 938 (FIG. 9A) or a keyhole 942 (FIG. 9B). Inclusion of a Y-portion or a key hole, in the coupling device, allows the shaft lock/coupling device to achieve a locked position in which the coupling device 918 is at least partially disposed between a head 934 included on the biased pin 328 (such as may be biased by spring 932) and mounting 926 in the motor housing such that the shaft lock is prevented from engaging the drive shaft (a locked position). For example, the portion of the coupling device adjacent the narrowed aperture of an included keyhole is sandwiched between a head included on a biased pin type shaft lock and a portion of the motor housing. In further embodiments, the coupling device is adjustable in order to be at least partially disposed in a recessed portion of a shaft lock or the like for preventing engagement of the shaft lock. For instance, a terminal end of the coupling device is engaged in a recess included in the shaft lock. Preferably, a locked position corresponds with electricity being allowed to flow to the motor. Including a coupling device with the ability to lock out the shaft lock may prevent accidental engagement of the shaft and the shaft lock. For example, a user is prevented from depressing the shaft lock when the motor is "on", thus preventing inadvertent contact between the shaft and the shaft lock.

As may be best seen in FIG. 9C, the coupling device 918 may be adjusted such that the shaft lock is capable of being manually depressed by the user. For example, the head 934 included on a biased pin is capable of being pressed through the large portion of the keyhole 942 to allow engagement with the drive shaft. In additional examples, the coupling device may be retracted to allow a user to press the shaft lock, i.e., by withdrawing the Y-end from between a head 934 and the motor housing and the like. See FIG. 9A.

Those of skill in the art will appreciate that the configuration of a switch assembly including the coupling device may be varied according to the functionality desired. For example, a coupling device may be configured so as to be adjustable to engage the drive shaft (an engaging position), allow a user to depress the drive shaft lock, prevent engagement of the shaft lock (locked position) and the like. It should also be apparent that various combinations may be desirable as well. It is the intention of this disclosure to encompass and include such variation.

Figure 10:
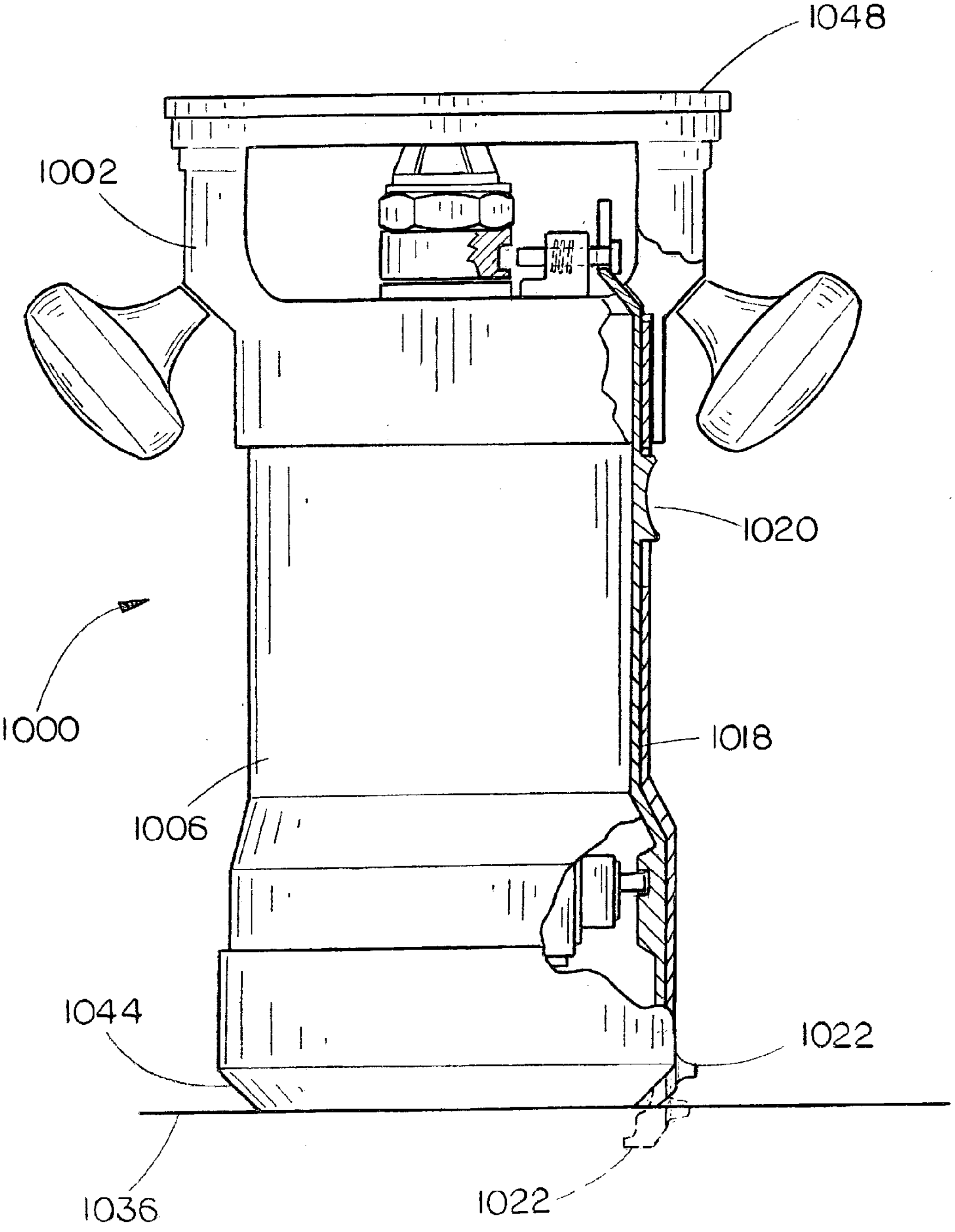
FIG. 10 is a cross-sectional side elevation view of a router including a switch assembly including a coupling device extendable beyond an end of the motor housing.
Figure 11:
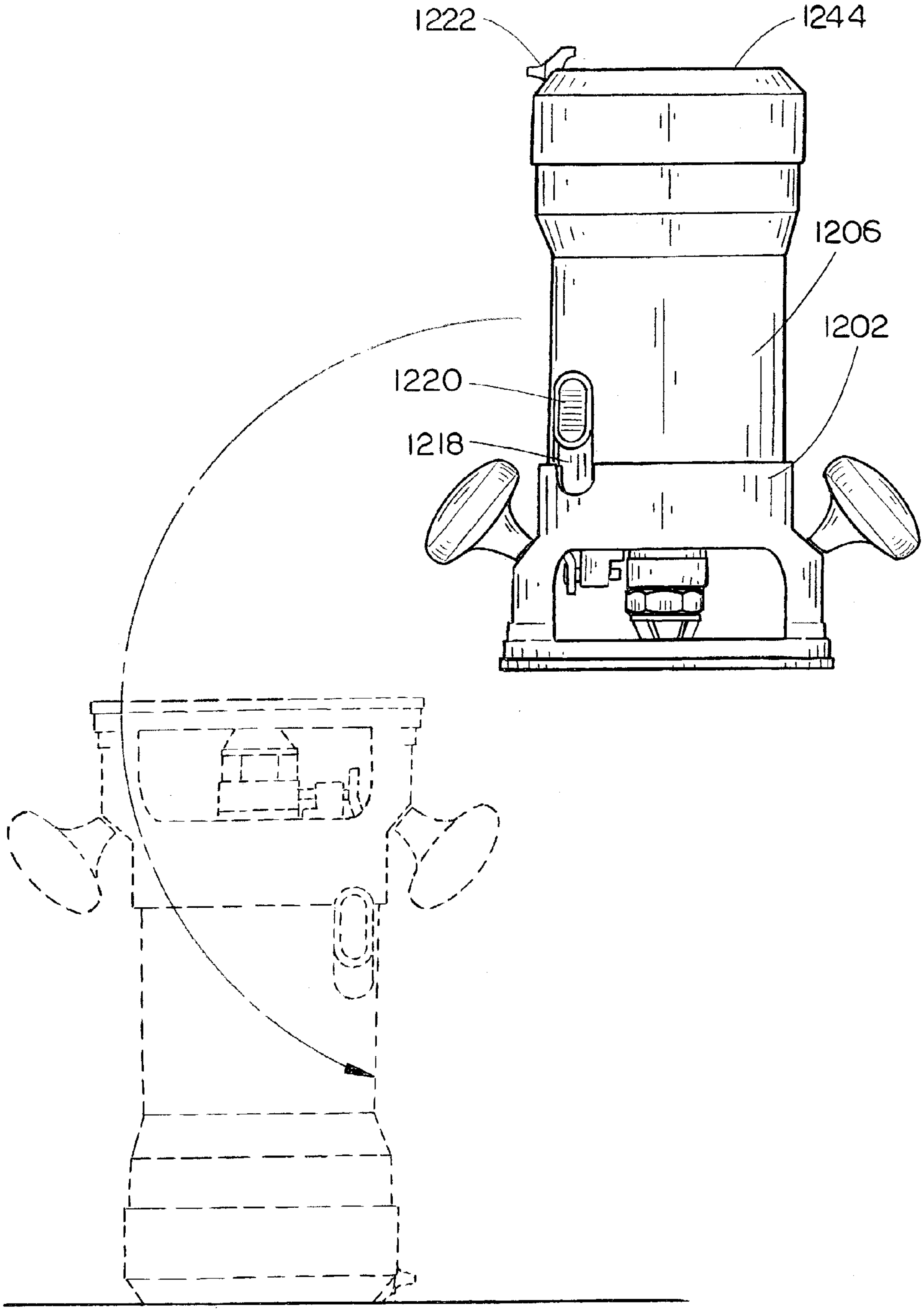
FIG. 11 is an illustration of a router including a switch assembly wherein supporting a motor housing on a surface results in the switch assembly being manipulated into an off position.

Referring to FIGS. 10 and 11, in an advantageous embodiment of the present invention, at least one of the coupling device 1018 and the first actuator 1022 extends beyond the plane encompassing the end of the motor housing 1044 (opposite a received base 1002/drive shaft end of the motor housing) when electricity is flowing to the motor. For example, the first actuator 1022 extends beyond the flat end 1044 of the motor housing when the switch is "on". The present configuration is preferred because it prevents a user from accidentally turning "on" the motor when the end of the motor housing 1044 is resting on a surface 1036. Referring to FIGS. 10 and 11, (wherein corresponding reference numbers refer to corresponding structures) if a user were to rest the router 1000 on a surface 1036 the coupling device/first actuator/second actuator 1020 would be automatically directed into an "off" position wherein the coupling device/actuator is equal to or contained (generally) within the motor housing 1006, as may be observed in FIG. 11 wherein disposing a router on a support surface such that the electricity is turned-off via movement of the first actuator 1222 is illustrated. Therefore, the flow of electricity to the motor may be inhibited when the motor housing 1006 is disposed on a surface, such as to change a sub-base 1048 or a working tool.

It is believed that the apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A power tool, comprising:

a motor housing;

a motor contained in the motor housing, for driving a working tool; and a switch assembly, for selectively providing electricity to the motor, including:

a switch electrically coupled to the motor, for controlling the flow of electricity to the motor;

a coupling device mounted in the motor housing, for manipulating the switch, the coupling device being at least one of a bar or a rod extending generally along the motor housing;

a first actuator connected to at least one of the switch or the coupling device, disposed adjacent the switch, said first actuator being configured for user manipulation; and a second actuator connected to the coupling device remotely from the switch, said second actuator being configured for user manipulation;

wherein user manipulation of at least one of said first actuator or said second actuator manipulates the switch.

2. The power tool of claim 1, wherein at least one of the first actuator or the second actuator is unitary with the coupling device.

3. The power tool of claim 1, wherein the first actuator is at least one of a flip actuator, a toggle actuator, a slide actuator, a rocker actuator, or a push-button actuator.

4. The power tool of claim 1, wherein the second actuator is at least one of thumb plate or a protrusion.

5. The power tool of claim 1, wherein the second actuator is disposed proximal to an end of the motor housing for being received in a base.

6. The power tool of claim 1, wherein the coupling device is a molded plastic bar.

7. The power tool of claim 1, wherein the switch is a slide switch.

8. A removable base router, comprising:

a generally cylindrical motor housing including a generally flat end for supporting the motor housing;

a base, including a base sleeve, being configured to adjustably receive the motor housing therein for supporting the router on a workpiece;

a motor contained in the motor housing, for driving a working tool; and a switch assembly, for selectively providing electricity to the motor, including:

a slide switch electrically coupled to the motor, for controlling the flow of electricity to the motor;

a coupling device slideably mounted longitudinally to the motor housing, for manipulating the switch, said coupling device including:

a first actuator connected to at least one of the switch or the coupling device, disposed adjacent the flat end of the motor housing adjacent the switch, said first actuator being configured for user manipulation; and a second actuator connected to the coupling device adjacent the base sleeve, said second actuator being configured for user manipulation when grasping at least one of the base or the motor housing;

wherein user manipulation of at least one of said first actuator or said second actuator slideably adjust the switch to obtain at least one of an on position whereby electricity flows to the motor, or an off position whereby electricity is inhibited from flowing to the motor.

9. The removable base router of claim 8, wherein the first actuator and second actuators are at least one of a protrusion, a button, or a thumb plate.

10. The removable base router of claim 8, wherein the coupling device is a bar.

11. The removable base router of claim 8, wherein the coupling device extends beyond the flat end of the motor housing when electricity is flowing to the motor.

12. The removable base router of claim 8, wherein the base sleeve includes a contoured portion for at least partially accepting the second actuator.

* * * * *